Figure 1:
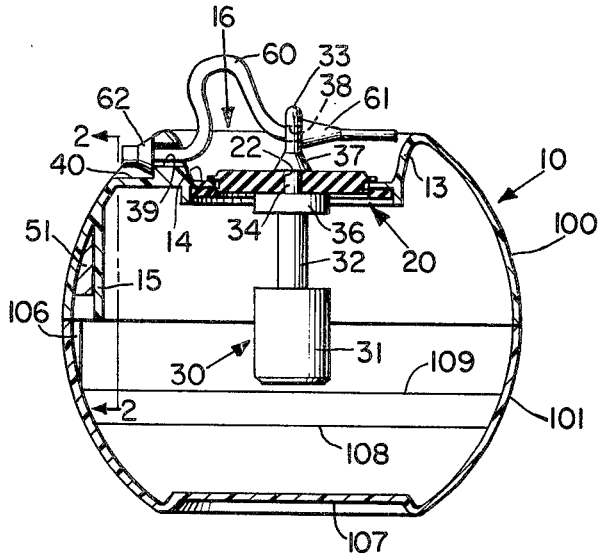
Figure 2:
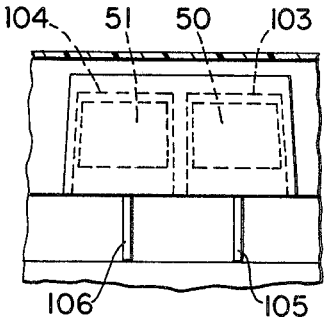
Figure 3:
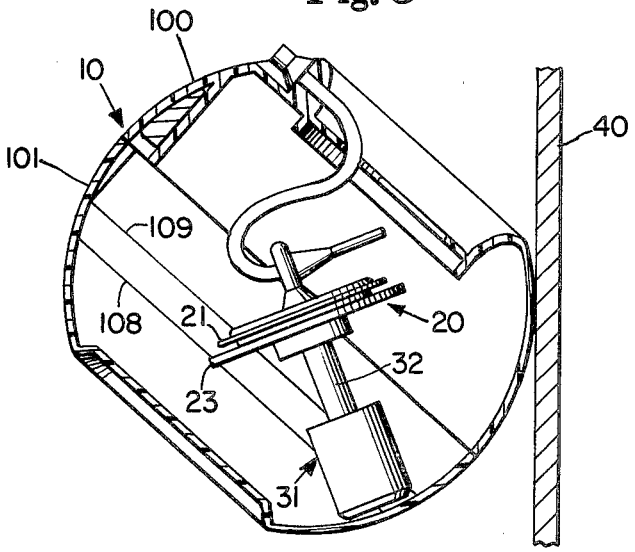
Figure 4:
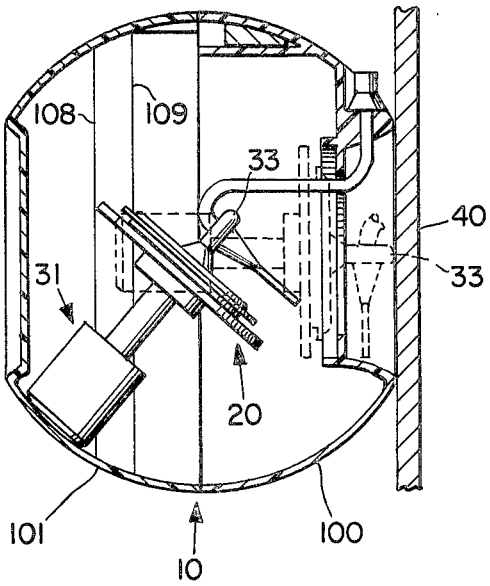

United States Defensive Publication [19] (H) [11] T993,001

McCarthy [43] Apr. 1, 1980

[54] FREE BODY AUTOMATIC LAUNDRY ADDITIVE DISPENSER

[75] Inventor: Robert F. McCarthy, Cincinnati, Ohio

[73] Assignee: The Proctor & Gamble Company, Cincinnati, Ohio

[21] Appl. No.: 54,514

[22] Filed: Jul. 3, 1979

[51] Int. Cl.[2] ..... D06F 39/02

[52] U.S. Cl. ..... 68/17 R; 68/207; 222/463; 222/500

[57] ABSTRACT

A dual-acting free body automatic dispenser for dispensing laundry additives into automatic washing machines. The dispenser comprises an assemblage of three major elements: a hollow, spherical container provided with an orifice; a resilient valve seated within the orifice and a rigid stempiece extending axially through the valve. The valve is positioned on the stempiece such that when seated a portion of the stempiece protrudes outwardly beyond the exterior of the container. A mass is attached to the interiorly extending end of the stempiece.

The consumer operates the dispenser by filling it with laundry additive, manually seating the valve and placing the dispenser in the washing machine's basket. The dispenser is triggered during the first spin cycle. If the dispenser is oriented with the protruding portion of the stempiece in contact with the basket, centrifugal force causes the container to be forced outwardly relative to the stempiece, thereby unseating the valve. If the dispenser is oriented in any other position, centrifugal force acts on the mass attached to the stempiece and the moment of forces thereby effected unseats the valve. After the spin cycle, the dispenser falls from the wall and rinse water floods the dispenser, mixing with the additive.

3 Claims, 2 Sheets Drawing,

15 Pages Specification

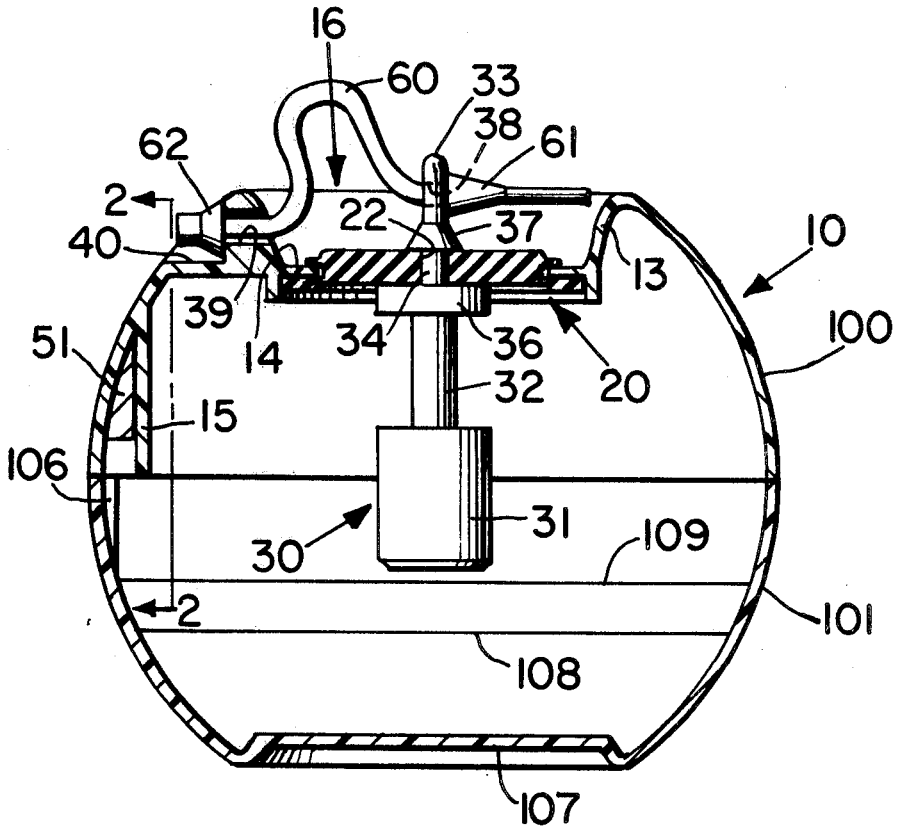

The file of this unexamined application may be inspected and copies thereof may be purchased (849 O.G. 1221, Apr. 9, 1968).